J. McKEE, Jr. & N. & M. RANDALL.
Farm-Gates.

No. 156,434. Patented Nov. 3, 1874.

Witnesses.
R. B. Turnbull
A. F. Cornell.

Inventor.
J. McKee, Jr.
N. & M. Randall.
Per Burridge & Co.
Attys.

UNITED STATES PATENT OFFICE.

JOHN McKEE, JR., OF NILES, AND NOAH RANDALL AND MILO RANDALL, OF MINERAL RIDGE, OHIO.

IMPROVEMENT IN FARM-GATES.

Specification forming part of Letters Patent No. 156,434, dated November 3, 1874; application filed April 23, 1874.

*To all whom it may concern:*

Be it known that we, J. McKEE, Jr., of Niles, in the county of Trumbull and State of Ohio, and NOAH and MILO RANDALL, of Mineral Ridge, in Trumbull county, Ohio, have invented new and useful Improvements in Farm-Gates, of which the following is a description, reference being had to the accompanying drawings, making a part of this specification, in which—

Figure 1:
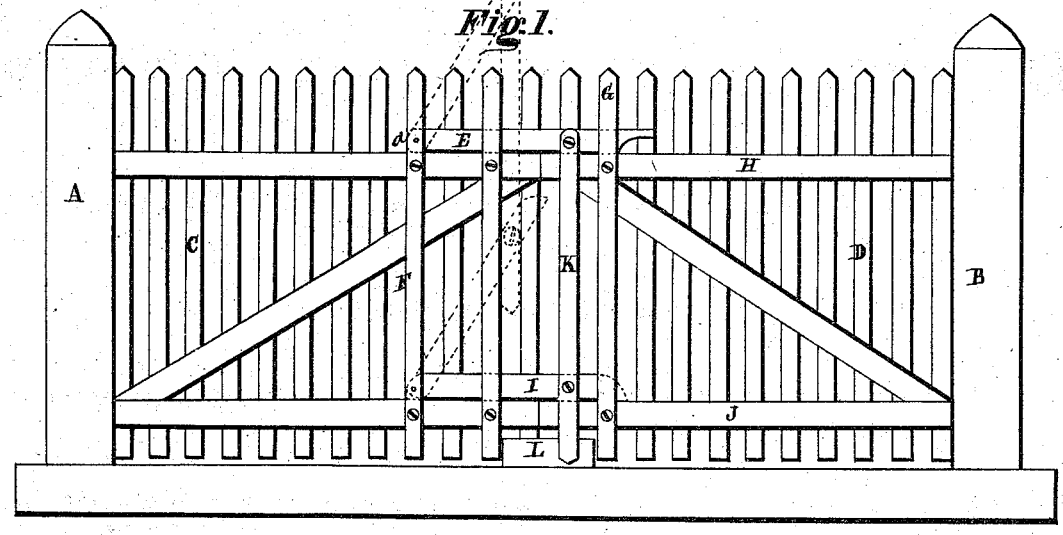
Figure 2:
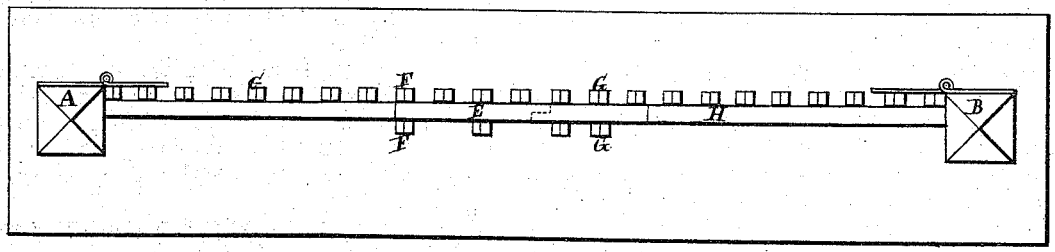

Figure 1 is a side view of the gate. Fig. 2 is a plan view.

Like letters of reference refer to like parts in the several views.

The nature of this invention relates to a farm-gate; and the object thereof is to fasten the gate at the top and at the bottom simultaneously, by the application thereto of a pair of arms, connected to each other by a link.

Of the construction and operation of the invention the following is a description in detail:

In the drawings, A B represent the gate-posts, to which are hinged the gates C D in any desirable way. E is an arm, one end whereof is pivoted at the point $a$ between the pickets F F, Fig. 2, of the gate C, whereas the opposite end extends over upon the gate D, and drops between the pickets G and upon the bar H. In like manner, an arm, I, is pivoted to the lower part of the gate between the pickets F F, and which arm also extends over upon the gate D, and drops between the pickets G and upon the bar J. The two arms are connected to each other by a link, K, the lower end of which extends down below the foot-block L. The two gates, as shown in the drawing, are represented as closed and fastened by the arms E I, which, in consequence of the pickets G, between which their free ends drop, prevent the gates from opening. Additional resistance to opening the gate is obtained by the foot-block L in its contact with the link K.

This manner of fastening the gate is simple and secure; is readily and easily operated for opening the gate by simply raising the arms E I to the position indicated by the dotted lines, which will permit the gate to swing open.

What we claim as our invention, and desire to secure by Letters Patent, is—

The arms E I, pivoted to the gate C, as described, and connected to each other by a link, K, arranged in combination with the gates H and C, and foot-block L, substantially as and for the purpose set forth.

JOHN McKEE, JR.,
      NOAH RANDALL.
      MILO RANDALL.

Witnesses:
 W. H. BURRIDGE,
 THOMAS J. MOORE.